United States Patent [19]

Clough

[11] Patent Number: 5,154,836
[45] Date of Patent: Oct. 13, 1992

[54] PROCESS FOR TREATING CONTAMINANTS IN AQUEOUS-BASED MATERIALS

[75] Inventor: Thomas J. Clough, Santa Monica, Calif.

[73] Assignee: Ensci, Inc., Santa Monica, Calif.

[21] Appl. No.: 538,158

[22] Filed: Jun. 14, 1990

Related U.S. Application Data

[63] Continuation-in-part of Ser. No. 361,709, May 25, 1989, Pat. No. 4,946,578, which is a continuation of Ser. No. 225,732, Jul. 29, 1988, abandoned, which is a continuation-in-part of Ser. No. 931,246, Nov. 17, 1986, abandoned.

[51] Int. Cl.$^5$ ............................................. C02F 1/72
[52] U.S. Cl. ............................ 210/747; 210/721; 210/724; 210/758; 210/763; 210/904; 210/908; 210/909; 210/911; 210/912
[58] Field of Search .............. 210/717, 721, 724, 747, 210/758, 759, 763, 904, 908, 909, 911, 912

[56] References Cited

U.S. PATENT DOCUMENTS

| | | | |
|---|---|---|---|
| 2,132,592 | 10/1938 | Wells et al. | 210/721 |
| 3,186,942 | 6/1965 | Benger | 210/763 |
| 3,442,802 | 5/1969 | Hamilton et al. | 210/763 |
| 3,487,016 | 12/1969 | Zeff | 210/763 |
| 3,617,567 | 11/1971 | Mathre | 210/904 |
| 4,022,588 | 5/1977 | Dessau | 44/1 R |
| 4,040,484 | 8/1977 | Hessert | 166/294 |
| 4,105,416 | 8/1978 | Burk, Jr. et al. | 44/1 R |
| 4,158,548 | 6/1979 | Burk, Jr. et al. | 44/1 R |
| 4,206,288 | 6/1980 | Detz et al. | 435/267 |
| 4,305,726 | 12/1981 | Brown, Jr. | 44/15 R |
| 4,314,902 | 2/1982 | Bouk et al. | 208/254 R |
| 4,491,454 | 1/1985 | Lompa-Krzymien | 44/15 R |
| 4,522,626 | 6/1985 | Espenscheid | 44/1 R |
| 4,552,217 | 11/1985 | Wu et al. | 166/270 |
| 4,581,131 | 4/1986 | Rudnick | 208/263 |
| 4,591,443 | 5/1986 | Brown et al. | 210/747 |
| 4,622,149 | 11/1986 | Devuyst | 210/721 |
| 4,752,379 | 6/1988 | Delaney | 208/251 R |
| 4,765,827 | 8/1988 | Clough et al. | 75/2 |
| 4,784,775 | 11/1988 | Hardison | 210/763 |
| 4,846,274 | 7/1989 | Clough | 166/268 |
| 4,946,578 | 8/1990 | Clough et al. | 208/46 |
| 5,004,551 | 4/1991 | Sublette | 210/763 |
| 5,045,214 | 9/1991 | Walker | 210/904 |

FOREIGN PATENT DOCUMENTS

| | | |
|---|---|---|
| 1470471 | 3/1969 | Fed. Rep. of Germany . |
| 4811321 | 2/1967 | Japan ............................ 208/244 |
| 1141746 | 1/1969 | United Kingdom . |
| 2031020 | 4/1980 | United Kingdom . |

OTHER PUBLICATIONS

McKibben, M. A. and Barnes, H. L., "Oxidation of pyrite in low temperature acidic solutions: Rate laws and surface textures", Geochim Cosmochim Acta 50, pp. 1509-1520.

Primary Examiner—Peter Hruskoci
Attorney, Agent, or Firm—Frank J. Uxa, Jr.

[57] ABSTRACT

A process for chemically modifying at least one contaminant component in an aqueous-based material comprising: contacting at least one contaminant component in an aqueous-based material with at least one metal component selected from the group consisting of vanadium components in which vanadium is present in the 5+ oxidation state in an amount effective to promote the chemical modification of the at least one contaminant component in the aqueous-based material, iron components in which iron is present in the 3+ oxidation state in an amount effective to promote the chemical modification of the at least one contaminant component in the aqueous-based material, manganese components in which manganese is present in the 3+ oxidation state in an amount effective to promote the chemical modification of the at least one contaminant component in said aqueous-based material and mixtures thereof, and at least one oxygen transfer agent in an amount effective to do at least one of the following: maintain at least partially the promoting activity of the metal component; produce at least a portion of the metal component; and oxidize at least a portion of the at least one contaminant component in the aqueous-based material, the contacting occurring at conditions effective to chemically modify the contaminant component in said aqueous-based material and increase the envornmental acceptability of the aqueous-based material.

39 Claims, No Drawings

PROCESS FOR TREATING CONTAMINANTS IN AQUEOUS-BASED MATERIALS

RELATED APPLICATION

This application is a continuation-in-part of co-pending application Ser. No. 361,709, filed May 25, 1989, now Pat. No. 4,946,578 which, in turn, is a continuation of application Ser. No. 225,732 filed July 29, 1988 now abandoned in turn, is a continuation-in-part of application Ser. No. 931,246, filed Nov. 17, 1986 now abandoned.

BACKGROUND OF THE INVENTION

This invention relates to a process for treating one or more contaminant components, e.g., organic materials particularly hydrocarbon-based materials, such as petroleum and petroleum fractions, and inorganic materials, in aqueous-based materials. More particularly, the invention relates to a process wherein one or more of such contaminant components in aqueous-based materials are chemically modified to increase the overall environmental quality or acceptability of the aqueous-based materials.

Petroleum and petroleum fractions are important fuels, sources of petrochemicals and chemicals, and large amounts are burned and consumed as feed stocks and/or chemical products. One of the principal drawbacks of the use of these materials as fuels, feedstocks and/or chemical products is that many such materials contain amounts of hydrocarbon and other organic components which generate unacceptable amounts of contaminants or pollutants, e.g., components which detrimentally affect the environmental quality or acceptability of the material in which such components are located, particularly in aqueous-based materials, such as process water streams, contaminated ground water streams and the like.

Similarly, aqueous-based streams containing objectionable inorganic contaminant components can be generated from important processes such as ore extraction, photographic processing, synthetics manufacturing and metal finishing. Such wastes can contain, for example, cyanide, arsenic, hydrazine and the like.

Many wastes, particularly hazardous wastes, are aqueous-based (water-based) solutions of toxic, contaminant components. The petroleum, paint and chemical industries are only a few of the industries generating large volumes of organic and/or inorganic contaminant components in aqueous-based materials.

Contaminated aqueous-based materials can be treated by extraction processes or destruction processes. In extraction processes, the contaminant components are removed from the solutions and thereby concentrated. The extracted materials are often reused. In destruction processes, such as biological degradation, wet air oxidation and chemical dechlorination, the contaminant components are rendered less hazardous by destruction. Many of the prior art destruction processes are either sensitive to contaminant components, e.g., heavy metal and cyanide toxicity in biological systems, and/or have high capital and/or operating costs associated with their use.

It would clearly be advantageous to process such organic and/or inorganic contaminant components, e.g., modify and/or otherwise treat such contaminated aqueous-based materials, to reduce the above-noted pollution concerns. In addition, it would be further advantageous for such processes to be usable for hazardous and non-hazardous materials and overcome many of the process toxic sensitivities and high costs associated with the prior art processes.

SUMMARY OF THE INVENTION

A new process for chemically modifying, preferably chemically reacting or chemically converting, at least one contaminant component in an aqueous-based material has been discovered. This process provides an effective, convenient and economical approach to chemically modifying, more preferably oxidizing, degrading, altering an environmentally adverse property of or the like, one or more contaminant components in an aqueous-based material, such as ground water, process water and the like.

One broad aspect of the present invention comprises contacting a contaminant component or components in an aqueous-based material With at least one oxygen transfer agent, preferably a reducible manganese component, and at least one vanadium component and/or at least one iron component and/or at least one manganese component at conditions effective to chemically modify, preferably oxidize, and/or degrade, and/or alter at least one environmentally adverse property of and/or the like, the contaminant component or components in the aqueous-based material. Vanadium is present in the $4+$ and/or $5+$ oxidation states, preferably in the $5+$ oxidation state, in an amount effective to promote the chemical modification of the contaminant component or components. Iron is present in an amount in the $3+$ oxidation state effective to promote the chemical modification of the contaminant component or components. Manganese is present in an amount in the $3+$ oxidation state effective to promote the chemical modification of the contaminant component or components. The vanadium component and/or the iron component and/or the manganese component is preferably at least partially soluble, more preferably substantially soluble, at the conditions of use. The oxygen transfer agent is present during the contacting in an amount effective to do at least one of the following: maintain at least partially the promoting activity of the vanadium component and/or iron component and/or manganese component; produce at least a portion of the vanadium component and/or iron component and/or manganese component; and chemically modify at least a portion of the contaminant component or components in the aqueous-based material.

In another broad aspect, the present process comprises contacting a contaminant component or components in an aqueous-based material with at least one manganese $(3+)$ cyclable ligand complex in which manganese is present in the $3+$ oxidation state in an amount effective to promote the chemical modification cf the contaminant component or components, and preferably with an oxidant, at conditions effective to chemically modify one or more of such contaminant components.

The present process advantageously results in the chemical modification of one or more contaminant components in the aqueous-based material. Such chemical modification, as described herein, of such contaminant components often results in the modification of one or more of the environmentally objectional characteristics of such contaminant component or components to yield product aqueous-based materials, including, for example, process water streams, ground water streams and the like, having, for example, a reduced level of such contaminant component or components; and/or in the conversion of such contaminant component or components to a less environmentally objectionable form, such as a solid precipitate with reduced solubility. In general, the present process provides a product aqueous-based material having increased environmental acceptability, i.e., increased environmental quality, relative to the contaminated aqueous-based material prior to the contacting. The present invention can provide a cost effective approach to providing improved environment control of water contaminated streams, such as process water streams, ground water streams and the like.

DETAILED DESCRIPTION OF THE INVENTION

The present process is effective for treating one or more contaminant components, e.g., organic-based components, such as hydrocarbons, and/or inorganic-based components, in aqueous-based materials. Organic-based contaminant components which may be treated in the present process can include organic sulfur, in particular, non-thiophenic sulfur. Examples of organic-based and hydrocarbon-based contaminant components which may be processed in accordance with the present invention include whole petroleums (crude oils including topped crude oils), petroleum residua (both vacuum and, preferably, atmospheric residua), gas oils, middle distillates (both diesel and jet fuel), naphthas, gasoline, alcohols such as methanol, ethanol and propanol, ethers such as methyl and ethyl tertiary butyl ether, organic acids such as benzoic acid, ketones, aldehydes, aromatic components including phenols and the like, organic materials containing hetero atoms such as nitrogen, sulfur and halogen, e.g., chloride, and the like, and mixtures thereof. The present process is particularly applicable to light feedstocks, such as those selected from the group consisting of napthas, petroleum middle distillates such as diesel and jet fuel, gasoline, oxygenated fuel and oxygenated blending components such as alcohols and ethers, and mixtures thereof.

Other contaminants which may be treated in the present process include, for example, materials which are active components in or products of a manufacturing process, such as cyanide or hydrazine, or a process by-product, such as arsenic in ore processing or a leached inorganic material, for example, toxic metal cations and/or organic insecticides, herbicides and other pesticides resulting from soil leaching due to continuous water usage in agriculture, e.g., the production of fruits and vegetables particularly in arid to semi-arid climates. Individual contaminant components may include both an inorganic portion, e.g., metal ion, and an organic portion both of which can be modified in accordance with the present invention.

In one embodiment of the invention, the process comprises: contacting the contaminant component or components in an aqueous-based material with at least one of the following: (1) at least one of certain vanadium and/or iron and/or manganese components present in an amount effective to promote the chemical modification of the contaminant component or components in an aqueous-based material and at least one oxygen transfer agent; and/or (2) at least one manganese (3+) ligand complex in an amount effective to promote such chemical modification, and preferably at least one oxidant. A product aqueous-based material having at least one improved property relative to the starting aqueous-based material is obtained.

The present process has been found to provide for the chemical modification of contaminant component or components in an aqueous-based material to provide less environmentally deleterious or more environmentally acceptable aqueous-based materials, preferably in high yields. For example, the vanadium components, iron components, manganese components, oxygen transfer agents, and oxidants, e.g., as described herein, which may be employed are relatively inexpensive, readily available and/or easy to produce. Even more important, such materials are of a chemical type and/or are used at a concentration which does not provide substantial adverse environmental effects, particularly the iron and manganese components which are preferred components of this invention.

The term "chemical modification" as used herein refers to a change in the contaminant component or components in an aqueous-based material, which change preferably results from the chemical conversion, e.g., chemical reaction, more preferably oxidation and/or degradation and/or alteration of at least one environmentally adverse property, of one or more of such contaminant components. In certain instances, no specific chemical reaction can be pointed to account for the change in the contaminant component or components. Also, the chemical modification may occur with regard to the carbon and/or hydrogen portions of the organic-containing contaminant components and/or to the other portions, e.g., such as contained sulfur, nitrogen, oxygen, halide, metals or the like, of such organic-containing contaminant components.

In addition, such modification can reduce one or more of the environmentally objectional characteristics of such contaminant component or components to yield aqueous-based materials including process water streams and ground water streams having, for example, a reduced level of such contaminated component or components, and/or result in the conversion of such contaminated component or components to a less environmentally objectionable form, such as a solid precipitate with reduced solubility.

One embodiment the present process involves contacting a contaminant component or components in an aqueous-based material with at least one metal component selected from vanadium components, iron components, manganese components and mixtures thereof, and at least one oxygen transfer agent. The vanadium component is such that vanadium is present in the 4+ and/or 5+ oxidation states, preferably in the 5+ oxidation state, in an amount effective to promote the chemical modification of the contaminant component or components in the aqueous-based material. The iron component is such that the iron is present in the 3+ oxidation state in an amount effective to promote the chemical modification of the contaminant component or components in aqueous-based material. The manganese component is such that the manganese is present, preferably in the 3+ oxidation state, in an amount effective to promote the chemical modification of the contaminant component or components in the aqueous-based material. The oxygen transfer agent is present in an amount effective to do at least one of the following: maintain at least partially the promoting activity of the metal component; produce at least a portion of the metal component; and oxidize at least a portion of the contaminant component or components in the aqueous-based material.

Such contacting may occur over a wide pH range, e.g., about 1 or less to about 13 or more, preferably at a slightly acidic pH, i.e., a pH no lower than about 4 preferably no lower than about 6, or at an alkaline pH. If vanadium is present, the contacting is more preferably conducted at a pH in the range of about 4 or about 6 to about 13, while if an iron component is present, the pH is more preferably about 4 or about 6.5 to about 9.5. If manganese 3+ is present, the pH is more preferably about 4 or about 7.5 to about 10.5. These more preferred pH ranges are particularly useful when it is desired to maintain the metal component substantially soluble, e.g., in the aqueous-based material, at the contacting conditions.

The vanadium component or components useful in the present invention may be chosen from any such components which function as described herein. Examples of useful components include soluble vanadium compounds such as, soluble vanadates and oxyanion derivatives thereof, complexes of vanadium with ligands and other compounds in which vanadium is present in the 5+ oxidation state. Preferably, the vanadium component or components are capable of being reduced to a lower oxidation state, e.g., to oxidize at least one contaminant component of an aqueous-based material and of being oxidized to the 5+ oxidation state by the oxygen transfer agent at the contacting conditions. In one embodiment, the vanadium component or components are preferably substantially soluble in the aqueous-based material at the contacting conditions. A particularly useful embodiment involves one or more vanadium (5+) complexes with ligands, which complexes, as well as the corresponding reduced forms during the time prior to reoxidation, are at least partially soluble, more preferably substantially soluble, in the aqueous-based material at the contacting conditions.

The iron component or components useful in the present invention may be chosen from any such components which function as described herein. Preferably, the iron component or components are capable of being reduced to a lower oxidation state, e.g., to oxidize at least one contaminant component of an aqueous-based material, and of being oxidized to the 3+ oxidation state by the oxygen transfer agent at the contacting conditions. In certain embodiments, the iron component or components are preferably substantially soluble in the aqueous-based material at contacting conditions. A particularly useful embodiment involves iron (3+) complexes with ligands, which complexes, as well as the corresponding reduced forms during the time prior to reoxidation, are at least partially soluble, more preferably substantially soluble, in the aqueous-based material at the contacting conditions.

The manganese component or components useful in the present invention may be chosen from any such components which function as described herein. Preferably, the manganese component or components are capable of being reduced to a lower oxidation state, e.g., to oxidize at least one contaminant component of an aqueous-based material, and of being oxidized to the 3+ oxidation state by the oxygen transfer agent at the contacting conditions. In certain embodiments, the manganese components or components are preferably substantially soluble in the aqueous-based material at contacting conditions. A particularly useful embodiment involves manganese (3+) complexes with ligands, which complexes, as well as the corresponding reduced forms during the time prior to reoxidation, are at least partially soluble, more preferably substantially soluble, in the aqueous-based material at the contacting conditions.

The oxygen transfer agent or agents may be chosen from any suitable materials capable of functioning as described herein. In certain instances, non-metal containing materials, such as molecular oxygen, may be employed. The oxygen transfer agent preferably includes at least one metal species which is capable of being reduced, e.g., to oxidize the vanadium or iron components, at the conditions of the present contacting. More preferably, the reduced oxygen transfer agent is also capable of being oxidized to the oxygen transfer agent at the present contacting conditions, although one time (e.g., once through) use of the oxygen transfer agent or reoxidation of the reduced oxygen transfer agent to the oxygen transfer agent external or separately from the present contacting can also be practiced. The oxygen transfer agent preferably includes at least one oxygen species. In one particularly useful embodiment, the oxygen transfer agent comprises a reducible, redox cyclable manganese component. The oxygen transfer agent is preferably at least partially soluble in the aqueous-based material.

By "reducible manganese component" or "RMC" is meant a manganese component which is capable of being chemically reduced at the conditions of the present contacting. Preferably, the RMC includes manganese, more preferably a major amount of manganese, in at least one of the 3+ and 4+ oxidation states. Particularly useful RMCs include manganese dioxide, i.e., $M_nO_2$, soluble manganese in the (3+) oxidation state and mixtures thereof. The RMC can be provided from any suitable source, such as manganese halide and the like. The manganese component originally present may be subjected to oxidation, e.g., by contact with air and/or other manganese oxidant in the presence of base, in order to obtain and/or regenerate the presently useful RMC. The amount of RMC employed may vary over a wide range depending on, for example, the specific RMC being employed, what, if any, oxidant is being used, the specific contaminant component or components being treated, and the type and degree of chemical modification desired. Preferably, the amount of RMC included in the present contacting step is sufficient to maintain the desired amount of vanadium in the 5+ oxidation state or the desired amount of iron in the 3+ oxidation state during the contacting. Substantial excesses of RMC should be avoided since such excesses may result in material separation and handling problems. In one embodiment, particularly in situ ground water upgrading, the reducible manganese component or components are substantially soluble in the aqueous-based material at the contacting conditions. Such substantially soluble manganese components are preferably selected from manganese (3+) ligand complexes and mixtures thereof, as described herein.

The contacting is preferably conducted in the presence of at least one additional oxidant, preferably other than the oxygen transfer agent, although it is contemplated that such oxidant and agent can be the same material, such as the use of oxygen with ferric and manganese (3+) metals. The oxidant is present in an amount effective to do at least one of the following: maintain at least partially the promoting activity of the vanadium and/or iron and/or manganese component and/or the manganese (3+) complex; produce at least a portion of the oxygen transfer agent; and oxidize at least one contaminant component in the aqueous-based material. Such oxidant is preferably selected so as to produce, or at least maintain, an effective amount of the oxygen transfer agent during the contacting. The oxidant or oxidants may be present during the contacting step and/or during a separate step to form and/or regenerate the vanadium and/or iron and/or manganese component, the manganese (3+) complex and/or the oxygen transfer agent.

Any suitable oxidant capable of performing one or more of the above-noted functions may be employed. The oxidant is preferably selected from the group consisting of molecular oxygen (e.g., in the form of air, dilute or enriched air, or other mixtures with nitrogen or carbon dioxide) singlet oxygen, ozone, inorganic oxidant components containing oxygen and at least one metal, preferably manganese, and mixtures thereof. More preferably, the oxidant is selected from the group consisting of molecular oxygen, oxidant components containing oxygen and at least one metal and mixtures thereof, especially molecular oxygen. A particularly useful oxidant comprises a mixture of molecular oxygen with carbon dioxide in an amount effective to promote the molecular oxygen access to and contact with organic hydrocarbons and/or hydrophobic inorganic material. The use of carbon dioxide has been found to enhance the chemical modification of the contaminant component or components, particularly at pH's less than about 7.5 or about 8.5. Although carbon dioxide may be used alone, i.e., substantially without an oxidant, it is preferably employed with an oxidant, and more preferably with molecular oxygen. When used with molecular oxygen, the carbon dioxide is preferably present in an amount in the range of about 0.1 to about 10 or even up to 1000 moles of carbon dioxide per mole of molecular oxygen. Care should be exercised to avoid using carbon dioxide in amounts which substantially detrimentally affect the pH of the aqueous-based material, or reduce the pH of the aqueous-based material below the desired level for solubility useful for metal component modification, e.g., oxidation, promotion activity.

Large excesses of the oxidant can be used so that the contaminant component or components are oxidized, degraded or altered or otherwise converted to a more environmentally acceptable form. The amount of oxidant employed is preferably in the range of about 95% to about 150% or even about 500% of that needed to oxidize the total amount of such contaminant component or components in the aqueous-based material being treated, or, in certain instances, of that needed to oxidize by one oxidation state the total amount of vanadium and/or iron and/or manganese component, and-/or manganese 3+ ligand complex and/or oxygen transfer agent fed to the present contacting step.

Without wishing to be limited to any particular theory of operation, an illustrative example of the vanadium/oxygen transfer agent/oxidant embodiment of the present invention is believed to function as follows. The vanadium (5+) component acts directly on the contaminant component or components to be chemically, preferably oxidatively, modified. This interaction results in the vanadium species being reduced in oxidation state. The oxygen transfer agent, however, acts to oxidize this "reduced" vanadium to the 5+ oxidation state, and the oxidant oxidizes the resulting reduced oxygen transfer agent to the oxygen transfer agent. Such oxygen transfer agents, and in particular reducible manganese components, have been found to be effective in oxidizing the vanadium component to the 5+ oxidation state, while various other oxidants, such as molecular oxygen, are substantially ineffective in oxidizing the reduced vanadium component or components. However, molecular oxygen is effective to oxidize a reduced redox cyclable manganese component to a reducible manganese component and a reduced redox cyclable iron complex to an iron (3+) complex.

The vanadium (5+) complexes, iron (3+) complexes and manganese (3+) complexes particularly useful in the present invention involve one or more ligands.

The presently useful metal complexes are preferably not fully complexed, for example, are partial ligand complexes, i.e., are not fully complexed at a ratio of ligand to metal which substantially reduces the redox cycling activity of the ligand complexes. This feature i.e., active redox cycling complexes, apparently facilitates the ability of the metal species to rapidly cycle between oxidation states and/or to promote the desired chemical modification, preferably oxidation, of the contaminant component or components. With vanadium complexes, the mol ratio of vanadium to ligand is more preferably about 1 to about 3, stil more preferably about 1 to about 2, with iron complexes the mol ratio of iron to ligand is more preferably about 1 to about 3, more preferably about 1 to about 2, and with manganese complexes the mol ratio of manganese to ligand is more preferably about 1 to about 2.0, still more preferably about 1 to about 1.5.

Any suitable ligand system may be employed. The ligands are preferably derived from the group consisting of compounds containing acetylacetonate functionality, carboxylic acid functionality (more preferably containing up to about 15 carbon atoms per molecule), poly, more preferably three, carboxylic acid functionalitis, substituted carboxylic acid functionality (more preferably containing up to about 15 carbon atoms per molecule) poly, more preferably three, substituted carboxylic acid functionalities including hydroxy carboxylic acid functionality, poly oxyanions, more preferably poly phosphate, for example tri poly phosphate, and mixtures thereof. Particularly useful ligand systems are derived from the group consisting of compounds containing acetylacetonate functionality, citric acid functionality, tartaric acid functionality, nitrilotriacetic acid functionality, pyrophosphate functionality and mixtures thereof, and their partial salts, partial esters and substituted derivatives thereof. Particularly preferred species are citric acid, tartaric acid, nitrilotriacetic acid and pyrophosphate and their partial salts and esters thereof as illustrated above. In addition, it is particularly preferred to use ligands which maintain both the oxidation/regeneration properties of the active metal and which, if ultimately released to the environment and/or used to treat ground water, have no substantial adverse effect on the environment and/or treated ground water and/or are degradable, such as biodegradable, over a reasonable period of time. Particularly preferred metals associated with such ligands are iron and manganese.

Further examples of iron (3+) complexes useful in the present invention include iron complexes with polyfunctional amines, for example, ethylenediamine, propylene diamine, ethanol amine, glycine and asparagine and salts thereof; phosphonic acids and phosphonic acid salts, for example, ethane-1-hydroxy-1, 1-disphosphonic acid; pyridine and substituted, chelating pyridine derivatives, for example, 1, 10-pehnanthroline, 2, 2'-bipyridyl, glyoxine and salicylaldehyde derivatives and mixtures thereof.

Especially suitable salt forms of ligands are the potassium, sodium and ammonium salts. Mixtures of ligands can be employed.

The specific amount of vanadium, iron and/or manganese component, oxygen transfer agent, and/or oxidant used to contact the contaminant component or components is not narrowly critical to the present invention. However, such amount or amounts should be sufficient to perform the function or functions as described herein. The amount or amounts of one or more of these materials to be used depends on many factors, for example, the specific contaminant component or components to be treated, and the type and degree of chemical modification desired. In general, the promoting amounts required are less, preferably substantially less, than the molar stoichiometry required for chemical modification, particularly destruction, by one-through or once-used conventional oxidants. In certain applications, the amount of each of the vanadium, iron and/or manganese components and the reducible manganese component is in the range of about 0.001% or 0.005% to about 1% by weight (calculated as elemental metal) of the aqueous-based material. In the event such metal components are at least partially or substantially soluble in the aqueous-based material, each of them is preferably present in the aqueous-based material in an amount in the range of about 0.005% to about 0.5% by weight (calculated as elemental metal).

Any suitable aqueous-based material, preferably liquid aqueous-based material, which includes one or more contaminant components may be processed in accordance with the present invention to increase its environmental quality or environmental acceptability. The aqueous-based material may also include one or more components, e.g., basic materials, such as lime, sodium hydroxide, sodium orthosilicate, sodium carbonate and-/or sodium bicarbonate and/or acidic materials such as hydrochloric acid and sulfuric acid, useful for controlling the pH of the aqueous-based material and/or for chemically reacting with one or more contaminant component or components to form, for example, a more stable inorganic material, e.g., with limited solubility.

The present contacting preferably takes place in the presence of a slightly acidic or alkaline aqueous-based material. The pH of the aqueous-based material may vary depending, for example, on the specific contaminant component or components being treated. More preferably, when vanadium is employed, the pH of the aqueous liquid medium is in the range of about 4 or about 6 to about 13. When iron 3+ is present, it is more preferred that the pH be in the range of about 4 or about 6 or about 8.5 to about 9.5 or about 10, and when manganese 3+ is present it is more preferred that the pH be in the range of about 4 or about 7.5 to about 10.5 or about 11.5.

The pH of the aqueous-based material may be adjusted or maintained during the contacting step, for example, by adding one or more basic or acidic components to the aqueous-based material. Any suitable basic or acidic component or combination of such components may be included in, or added to, this aqueous-based material to provide the desired basicity and acidity, respectively. For example, basic alkali metal and alkaline earth metal components, e.g., hydroxides, silicates, carbonates and bicarbonates, mixtures thereof and the like may be employed. Because of cost, availability and performance considerations, lime, sodium hydroxide, sodium carbonate, and mixtures thereof are preferred.

The aqueous-based material comprises water, generally a major amount of water, and preferably at least about 70% or about 90% or about 95% or more by weight of water.

The present contacting step preferably takes place at temperatures of less than about 300° C., more preferably at temperatures in the range of about 20° C. to about 200° C. or in the case of in situ contacting, e.g., of ground water, generally at ambient temperature. The contacting pressure and contacting time may vary over wide ranges and are not narrowly critical to the present invention. Pressures in the range of about 5 psia or less to about 1000 psia or more may be employed. Satisfactory results are achieved at pressures in the range of about atmospheric to about 100 psia. and are preferred to minimize equipment requirements and costs. Contacting times may vary depending, for example, on the specific contaminant component or components being treated, the specific metal-containing and other, if any, components present during the contacting, and the type and degree of chemical modification desired. Contact times in the range of about 5 minutes or less to about 24 hours or more may be used. In certain embodiments, the contact time is preferably in the range of about 20 minutes to about 6 hours, more preferably about 0.5 hours to about 3 hours. During the contacting, agitation can be advantageously employed to enhance contacting. Mechanical mixers can be employed. Since the contacting can occur at ambient or moderately elevated temperatures, e.g., about 100° C. or less, processing can take place in a holding or storage area e.g., storage tank) ponding area, lagoon, trickling filters and the like in which the residence time of the contaminant component or components being modified is often measured in days, weeks or even months.

The contacting step may be carried out in any conventional manner, e.g., batchwise, semi-batchwise or continuously. Conventional equipment, such as stirred tanks, rotating contactors, agitated or stirred autoclaves and the like, may be employed in performing the contacting step. One particularly useful embodiment involves contacting a contaminated ground water stream or supply in accordance with the present invention in situ, i.e., in its natural location, e.g., in the ground. Such contacting can be accomplished by placing, e.g., injecting, the metal component or components (and possibly other components) needed for the contacting in the contaminated ground water stream to be treated.

After the contacting step, the treated contaminant component or components are preferably partially and-/or totally destroyed, or altered or converted to a more stable form and precipitated in place or removed from the aqueous-based material. For example, treated inorganic-based contaminant component or components may be separated, e.g., by settling, centrifugation and the like, from the aqueous-based material. In addition, other techniques, such as distillation, filtration and the like, can be employed to provide one or more concentrated inorganic-based materials which can be disposed of as is or can be subjected to further processing.

The following non-limiting examples illustrate certain of the advantages of the present invention.

Cyanide Destruction

Cyanide waste streams are produced by several industries including ore extraction, photographic processing, and metal finishing.

Cyanide-containing wastes include metal finishing contaminated rinse water, spent process solutions, and accidental spils. Metal finishers use cyanide baths to hold metal ions such as zinc and cadmium in solution during the electroplating operation. Metal platers may also use cyanide in their stripping solutions.

Contaminated rinse waters generally have cyanide concentrations under 100 milligrams per liter (mg/l), and typically at about 10 mg/l to about 20 mg/l. These dilute wastes are usually treated to meet municiple pretreatment requirements and are then discharged to sewers.

Spent cyanide process solutions typically have concentrations about 1,000 mg/l. Batch discharges of these spent solutions occur periodically when the quality of the solution is no longer suitable for the plating operation.

In addition, plating baths can have cyanide concentrations up to about 5,000 mg/l. Solutions with cyanide concentrations up to about 5,000 mg/l or solutions that are heavily complexed with iron or nickel generally require staged treatment. Treatment of concentrated cyanide solutions can produce a great deal of heat and undesirable side reactions can take place unless the operation is well controlled.

EXAMPLE 1

To a cyanide waste water stream containing 100 mg/l cyanide is added 0.05 weight percent vanadium +5 citrate (2 citrate to 1 vanadium). The pH is adjusted to 11 and the waste water stream at ambient temperature is passed over a coarse filter containing a uniformly distributed coarse manganese dioxide ore (pyrolucite) at a solids concentration of about 1% by weight. The cyanide reacts in a single step to produce cyanate, which then hydrolizes to form carbonate and ammonium ions. The concentration of cyanide in the waste water stream is substantially reduced.

The process of this invention overcomes certain disadvantages, e.g., the emission of volatile intermediate reaction products, and chemical interference in the treatment of mixed waste, of prior art cyanide oxidation processes such as the chlorine or hypochlorite process. For example, improper chlorination of cyanide ion, hydrogen cyanide, or thiocyanate ion, particularly under conditions below pH 10, may result in increased evolution of cyanogen chloride, which is as hazardous as hydrogen cyanide. The process by this invention also has reduced susceptibility to interference by other metals such as copper, which can cause chemical degradation prior to cyanide destruction.

Organic Material

Treatment of organic wastes generally involves the degradation of organic materials, generally to carbon dioxide, water, nitrate and sulfate. Industrial wastewater streams are usually nonhazardous. These streams may contain hazardous components, but concentrations are generally small.

The susceptibility of organic materials to degradation can vary. The degradation of a compound can involve several steps each carried out at a different severity. Among the compounds which are degradable in waste streams are many chlorinated and aromatic compounds.

EXAMPLE 2

To an aqueous waste stream containing 2,000 mg/l total organics, and 500 mg/l of phenol, benzoic acid and chloro benzoic acid is added 0.05 weight percent ferric tartrate (2 tartrate to 1 iron). The stream is contacted with oxygen for a period of 24 hours at a pH of 9.5 and a temperature of 50° C. and atmospheric pressure. A reduction in total organics is obtained.

Ground Water

Heavy metal pollutants are generally adsorbed by the ground, but other pollutants including many toxic organic compounds, easily migrate into ground water supplies. Negligent disposal practices, leaking underground storage tanks, and the widespread application of pesticides to agricultural lands have resulted in the contamination of many aquifers.

Treatment technologies applicable to contaminated ground water are similar to those used to treat industrial process waste water streams. However, contaminated ground water poses unique problems that influence the choice of treatment methods. Most ground water treatment is conducted above ground, the contaminated ground water being pumped to the surface for treatment. Because pollutant concentrations change over time, the treatment systems must be able to respond to these variations in concentration and flow.

Contaminated ground water usually contains only low concentrations (less than one percent) of organic chemicals.

In situ (or in place) treatment systems degrade, remove, or detoxify hazardous waste in the zone of contamination. In situ treatment occurs primarily within the soil or aquifer differing from other on-site treatment techniques which are primarily above ground processes. In situ methods reduce the need for expensive soil excavation and costly transportation to landfills or to off-site treatment facilities. In situ treatments can be effective and economical detoxification methods.

EXAMPLE 3

An aqueous stream containing organic contaminants is recovered from ground water. The organic compounds are oxidized to carbon dioxide, water and partially oxidized compounds which increase the effectiveness of any further downstream treatment, e.g., partial oxidation of refractory organic compounds greatly increases their biodegradability. The oxidation is initiated with manganese 3+ pyrophosphate and dissolved oxygen at a pH of 6. The manganese concentration is 0.05 weight percent. The contacting takes place over a period of 48 hours.

Similarly contaminated ground water is treated by in situ chemical precipitation. The contamination of an aquifer by arsenic is remedied by injection of a dilute manganese 3+ citrate/(1.5 citrate to 1 manganese) solution saturated with dissolved oxygen. The trivalent arsenic is oxidized to pentavalent arsenic, which precipitates arsenic. In the ground water,, typical arsenic reductions are from 13.6 mg/l to 0.06 mg/l. Similarly, antimony can also be oxidized and removed by precipitation.

While this invention has been described with respect to various specific examples and embodiments, it is to be understood that the invention is not limited thereto and that it can be variously practiced within the scope of the following claims.

What is claimed is:

1. A process for oxidizing at least one organic based contaminant component in an aqueous-based material comprising:

contacting at least one of said contaminant component with at least one metal component selected from the group consisting o vanadium complex with ligand components in which vanadium is present in the 5+ oxidation state in an about effective to promote the oxidation of said at least one contaminant component, iron complies with ligand components in which iron is present in the 3+ oxidation state in an amount effective to promote the oxidation of said at least one contaminant component, manganese complex with ligand components in which manganese is present in the 3+ oxidation state in an amount effective to promote the oxidation of said at least one containment component and mixtures thereof, and at least one oxygen transfer agent in an amount effective to do at least one of the following: maintain at least partially the promoting activity of said metal component and produce at least a portion of said metal component; said contacting occurring at conditions effective to cycle said metal component between oxidation states and to oxidize said contaminant in said aqueous-based material and reduce the containment component level of said contaminant aqueous based material.

2. The process of claim 1 wherein said oxygen transfer agent is an oxygen containing component.

3. The process of claim 2 wherein said at least one containment component is a hydrocarbon based component.

4. The process of claim 2 wherein said metal is not fully complexed with the ligand.

5. The process of claim 4 wherein at least one of said vanadium (5+) complex, said iron (3+) complex and said manganese (3+) complex include a ligand derived from the group consisting of compounds having acetylacetonate functionality, carboxylic acid functionalities, substituted carboxylic acid functionalities and mixtures thereof.

6. The process of claim 1 wherein said at least one contaminant component is a hydrocarbon based component.

7. The process of claim 1 wherein said metal component is substantially soluble in said aqueous-based material at said contacting conditions.

8. The process of claim 1 wherein said oxygen transfer agent is at least partially soluble in said aqueous-based material at said contacting conditions.

9. The process of claim 1 wherein said oxygen transfer agent is a reducible manganese component.

10. The process of claim 9 wherein said reducible manganese component is selected from the group consisting of manganese 3+ components, manganese 4+ components and mixtures thereof.

11. The process of claim 9 wherein said reducible manganese component includes at least one manganese (3+) ligand complex.

12. The process of claim 11 wherein said manganese (3+) ligand complex is a partial ligand complex.

13. The process of claim 1 wherein said oxygen transfer agent is oxygen.

14. The process of claim 1 wherein said metal component is not fully complexed with the ligand.

15. The process of claim 14 wherein at least one of said vanadium (5+) complex, said iron (3+) complex and said manganese (3+) complex includes a ligand derived from the group consisting of compounds having acetylacetonate functionality, carboxylic acid functionalities, substituted carboxylic acid functionalities and mixtures thereof.

16. The process of claim 1 wherein said metal component is at least one of said vanadium components, and said contacting occurs at a pH in the range of about 4 to about 13.

17. The process of claim 1 wherein said metal component is at least one of said vanadium components and said contacting occurs at a pH in the range of about 6 to about 13.

18. The process of claim 1 wherein said metal component is at least one of said iron components and said contacting occurs at a pH in the range of about 4 to about 9.5.

19. The process of claim 18 wherein said iron component is an iron (3+) complex with at least one ligand derived from an iron complexing agent selected from the group consisting of poly-functional amines an salts thereof, phosphoric acids and salts thereof, pyridine and substituted, chelating pyridines derivatives, glyoxine and salicylaldehyde derivatives, condensed phosphates and mixtures thereof.

20. The process of claim 1 wherein said metal component is at least one of said iron components and said contacting occurs as a pH in the range of about 6.5 to about 9.5.

21. The process of claim 1 wherein said contacting occurs in the presence of an oxidant other than said metal component and said oxygen transfer agent, said oxidant being present in an amount effective to do at least one of the following: maintain at least partially the promoting activity of said metal component and produce at least a portion of said oxygen transfer agent.

22. The process of claim 21 wherein said oxidant is an oxygen-containing component.

23. The process of claim 21 wherein said oxidant is molecular oxygen.

24. The process of claim 1 wherein said contacting occurs in a storage system for said aqueous-based material.

25. The process of claim 1 wherein said aqueous-based material is ground water and said contacting takes place in situ.

26. The process of claim 1 which further comprises recovering a purified aqueous-based material from said contacted aqueous-based material having a reduced concentration of said at least one contaminant component relative to said aqueous-based material prior to said contacting.

27. A process for oxidizing at least one organic based contaminant component in an aqueous-based material comprising:

contacting at least one of said contaminant component with at least one metal component selected from the group consisting of vanadium complex with ligand components in which vanadium is present in the 5+ oxidation state in an amount effective to promote the oxidation of said at least one contaminant component, iron complex with ligand components in which iron is present in the 3+ oxidation state in an amount effective to promote the oxidation of said at least one contaminant component, manganese complex with ligand components in which manganese is present in the 3+ oxidation state in an amount effective to promote the oxidation of said at least one contaminant component and mixtures thereof, said contacting occurring in the presence of at least one first oxygen transfer agent said oxygen transfer agent being present in an amount effective to do at least one of the following: maintain at least partially the promoting activity of said metal component and produce at least a portion of said metal component; and at least one second oxygen transfer agent in an amount effective to maintain at least partially, the maintaining activity of the first oxygen transfer agent, said contacting occurring at conditions effective to cycle said metal component between oxidation states to oxidize said contaminant component in said aqueous-based material and reduce the contaminant component level of said contaminant aqueous based material.

28. The process of claim 27 wherein said at least one contaminant component is an organic based component.

29. The process of claim 27 wherein said manganese (3+) ligand complex is at least partially soluble in said aqueous liquid medium at said contacting conditions.

30. The process of claim 27 wherein said manganese (3+) ligand complex includes a ligand derived from the group consisting of compound having acetylacetonate functionality, carboxylic acid functionalities, substituted carboxylic acid functionalities and mixtures thereof.

31. The process of claim 30 wherein said oxidant is an oxygen-containing component.

32. The process of claim 30 wherein said oxidant is molecular oxygen.

33. The process of claim 27 wherein said contacting occurs in the presence of at least on oxygen containing oxygen transfer agent.

34. The process of claim 33 wherein said oxygen transfer agent is molecular oxygen.

35. The process of claim 34 wherein said oxygen transfer agent is another reducible manganese component.

36. The process of claim 27 wherein said contacting occurs at a pH in the range of about 4 to about 10.5.

37. The process of claim 27 wherein said contacting occurs in a storage system for said aqueous-based material.

38. The process of claim 27 which further comprises recovering a purified aqueous-based material from said contacted aqueous-based material having a reduced concentration of said at least one contaminant component relative to said aqueous-based material prior to said contacting.

39. The process of claim 27 wherein said aqueous-based material is ground water and said contacting takes place in situ.

* * * * *